April 15, 1941.    P. W. TIERNEY    2,238,480
HANDLE LATCH MECHANISM
Filed Jan. 4, 1940
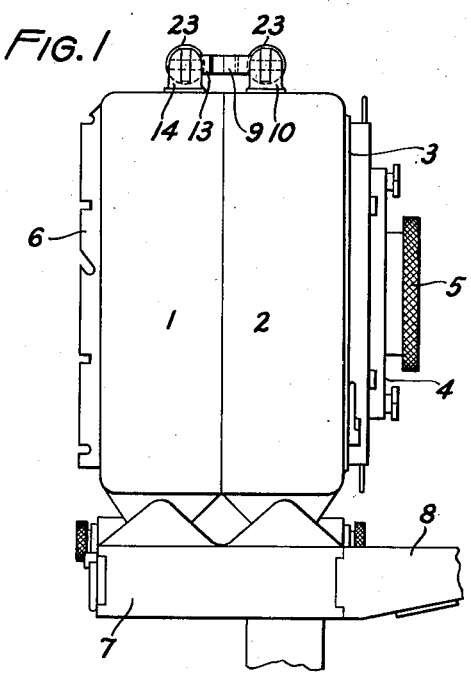
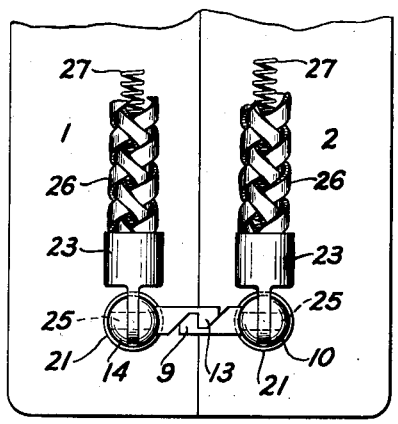
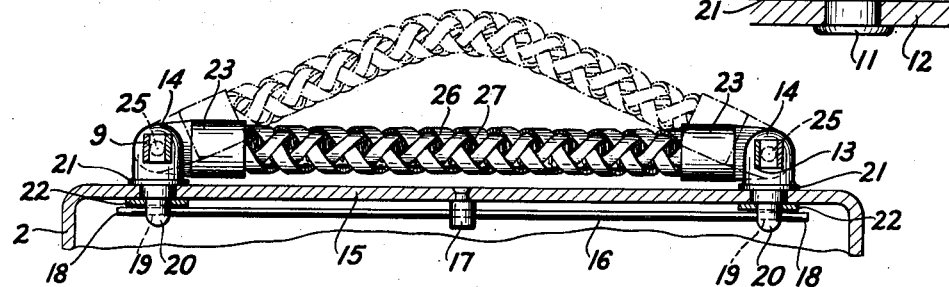
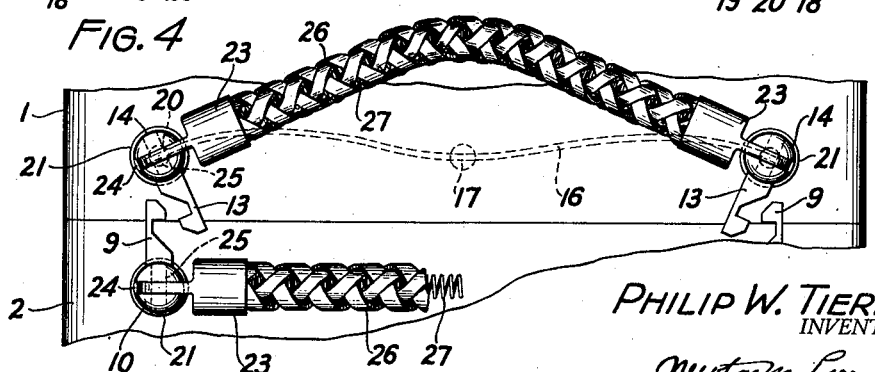
PHILIP W. TIERNEY
INVENTOR
BY
ATTORNEYS

UNITED STATES PATENT OFFICE 2,238,480

HANDLE LATCH MECHANISM

Philip W. Tierney, Rochester, N. Y., assignor to Eastman Kodak Company, Rochester, N. Y., a corporation of New Jersey Application January 4, 1940, Serial No. 312,442

4 Claims. (Cl. 292—28)

This invention relates to a handle latch structure which is suitable for connecting a pair of relatively movable parts.

One object of my invention is to provide an elastic handle which may be used for carrying the relatively movable parts and to provide a handle structure which may be moved to an abnormal position to release latch elements holding the relatively movable parts together. Another object of my invention is to provide a latch structure, including pairs of latch elements mounted on oscillatable posts which are adapted to engage pairs of relatively fixed latch elements to normally hold parts together, and to provide a means for readily unlatching the latch elements. Other objects will appear from the following specification, the novel features being particularly pointed out in the claims at the end thereof.

Coming now to the drawing wherein like reference characters denote like parts throughout:

Fig. 1 is a side elevation of a pair of relatively movable camera parts which are provided with a handle latch structure constructed in accordance with and embodying a preferred form of my invention.

Fig. 2 is a fragmentary plan view of a portion of the latch structure shown in Fig. 1, but on an enlarged scale.

Fig. 3 is an enlarged fragmentary sectional view showing my improved handle latch structure, and particularly the movable posts which support one set of latch members.

Fig. 4 is a fragmentary plan view showing the latch elements in an unlatching position.

Fig. 5 is an enlarged fragmentary sectional view showing one of the fixed posts and indicating the anchorage of the end of the handle to one of the posts.

My invention is particularly suitable for cameras which may be made of several parts which are normally latched together for carrying the camera and which must be released for opening the camera for use. As indicated in Fig. 1, the relatively movable camera parts 1 and 2 may be provided with the usual camera front 3, supporting a lens board 4 and an objective 5. Part 1 of the camera may be provided with a suitable support 6 for a plate or film holder, and each of the parts may be mounted to move on a base member 7, which may be provided with an extensible track 8, all as is well known.

In accordance with my present invention, I provide the handle latch structure which will now be described. The latch structure comprises hook-like latch elements carried by the parts 1 and 2 and positioned to be engaged, as shown in Fig. 2. The latch element 9 of part 2 may be carried by a post 10, which, as shown in Fig. 5, is riveted at 11 fixedly in place relative to the camera wall 12, the latch projecting toward a second latch element 13, carried by a post 14, which, as shown in Fig. 3, may be mounted to oscillate upon the wall 15 of the movable camera section 2. The latch elements 9 and 13 are shown in engagement in Fig. 2, this being a normal position, because of the spring 16 shown in Fig. 3.

This spring passes through and is connected to a rivet 17 which holds the center portion of the spring, the ends 18 of the spring passing through spring guideways which are here shown as apertures 19 in the downwardly extending ends 20 of the posts 14 which are provided on the upper side of the camera casing with flanges 21 and which are encircled by washers 22 on the under sides of the wall 15. Thus, the ends 18 of the spring member serve as pins to prevent withdrawal of the posts 14, but to permit these posts to turn.

Since the spring wire 16 is usually straight, it will hold the posts 14 in the position shown, so that the ferrules 23 may lie in the slots 24 of the posts 14 and may turn about the pivots 25 without altering the position of the posts. The ferrules 23 support a flexible handle made in two parts—an outer braided covering 26 which may be of leather, or other suitable material, and an inner coil spring 27. As indicated in Fig. 5, the ferrules 23 are threaded at 28 so that the braided covering 26 is anchored in place by the convolutions of the spring 27 which presses the covering into the threads 28.

When the camera is being carried in a collapsed or folded position, with the parts 1 and 2 in contact, the flexible handles may spring upwardly away from the camera parts while at the same time the latch elements 9 and 13 will be held in contact.

It should be noticed that there are two pairs of similar latch elements arranged at each end of the flexible handle 26, 27. The spring 16, as above described, normally holds these two pairs of latch elements in engagement. However, when the camera is to be opened up for taking pictures, one of the handles 26, 27—the one which is attached to the movable posts 14—may be moved transversely of the camera casing so as to oscillate the posts 14 against the pressure of the spring 16, as indicated in Fig. 4. This causes the latch elements 13 to swing away from the latch elements 9 and permit the parts 1 and 2 to be separated.

As soon as the latches are separated and the handle 26, 27 is released, the spring in the handle will tend to move it flat against the top of its supporting part, as shown in Fig. 3, and the spring 16 will oscillate the posts 14 to the position shown in Fig. 3.

In this position, when the camera parts are to be folded, and the relatively movable members 1 and 2 are brought into engagement, the latch elements 13, because of the spring 16, will snap into the operative relationship shown in Fig. 2, thus holding the camera parts together.

From the above description, it will be seen that I have provided a simple form of handle latch mechanism in which the two flexible handles may be used to carry the latched camera parts. One of these handles also provides a quick means for releasing a pair of movable latch members from a pair of the relatively fixed latch members, so that the camera parts may be separated.

What I claim is:

1. A latch comprising two pairs of posts, at least one pair being pivotally mounted, latch elements fixedly carried by and projecting from said posts, a single elongated spring operably connected to each of the pair of pivotally mounted posts, and tending to hold said posts in an operative position in which said latch elements are in latching engagement, a flexible carrying handle attached to said movable posts and having a normal carrying position in which the latch elements remain in latching engagement, said carrying handle being movable from the normal carrying position to a second position adapted to oscillate said pivotally mounted posts against the action of their springs to release said latch elements.

2. A latch for a pair of relatively movable parts comprising two pairs of posts, one pair on each part, one pair of posts being pivotally mounted to oscillate and having spring guideways therein, a spring, the ends of which engage the guideways to hold the posts in a normal position, latch elements on each post adapted to be in latching engagement when said movable posts are in their normal position, two spring handles, one connecting each pair of posts, said handles having a normally carrying position above the posts in which the latch elements are engaged, the handle connected to the movable posts being movable to an abnormal position to one side of the posts for oscillating said posts to release the latch elements.

3. A latch for a pair of relatively movable parts comprising two pairs of posts, one pair on each part, one pair of posts being pivotally mounted to oscillate and having apertures therein, a spring having the ends thereof slidably mounted in the apertures, means near the middle of the spring for attaching said spring to the part supporting the oscillatable posts, latch elements on each post adapted to be in latching engagement when said movable posts are in their normal position, two spring handles, one connecting each pair of posts, said handles having a normally carrying position above the posts in which the latch elements are engaged, the handle connected to the movable posts being movable to an abnormal position to one side of the posts for oscillating said posts to release the latch elements, as the ends of the spring slide in the post apertures, said spring immediately returning the posts to their normal position for engaging said latch elements upon the release of the spring handle.

4. A latch for a pair of relatively movable parts comprising a pair of spaced latch elements on each of said parts, one pair of said elements being fixedly mounted on one of said parts and the other pair of elements being movably mounted on the other of said parts and adapted to cooperate with the fixed elements to retain the parts in connected relation, spring means for moving said movable elements in one direction to engage said fixed elements, and a handle connecting said movable elements and capable of movement relative to said parts to a position to act as a carrying means therefor and also capable of movement to a position normal to said first position to provide a means for moving the movable elements in another direction to disengage said elements.

PHILIP W. TIERNEY.